(12) United States Patent
Blanc

(10) Patent No.: US 10,622,644 B2
(45) Date of Patent: Apr. 14, 2020

(54) PROCESS FOR TREATING A BIPOLAR PLATE FOR A FUEL CELL

(71) Applicant: COMPAGNIE GENERALE DES ETABLISSEMENTS MICHELIN, Clermont-Ferrand (FR)

(72) Inventor: Claude Blanc, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 211 days.

(21) Appl. No.: 15/572,885

(22) PCT Filed: May 17, 2016

(86) PCT No.: PCT/EP2016/060967
§ 371 (c)(1),
(2) Date: Nov. 9, 2017

(87) PCT Pub. No.: WO2016/188790
PCT Pub. Date: Dec. 1, 2016

(65) Prior Publication Data
US 2018/0145344 A1 May 24, 2018

(30) Foreign Application Priority Data

May 22, 2015 (FR) .................... 15 54610

(51) Int. Cl.
| | |
|---|---|
| *H01M 8/0254* | (2016.01) |
| *B29C 53/18* | (2006.01) |
| *H01M 8/0271* | (2016.01) |
| *H01M 8/0267* | (2016.01) |
| *H01M 8/1018* | (2016.01) |
| *H01M 8/0297* | (2016.01) |

(52) U.S. Cl.
CPC .......... *H01M 8/0254* (2013.01); *B29C 53/18* (2013.01); *H01M 8/0271* (2013.01); *H01M 8/0267* (2013.01); *H01M 8/0297* (2013.01); *H01M 2008/1095* (2013.01)

(58) Field of Classification Search
CPC ............................ H01M 8/0254; B29C 53/18
See application file for complete search history.

(56) References Cited

U.S. PATENT DOCUMENTS

| | | | | |
|---|---|---|---|---|
| 7,451,907 | B2 | 11/2008 | Sigler et al. | 228/157 |
| 9,853,307 | B2 * | 12/2017 | Lai | H01M 8/04201 |
| 2003/0213276 | A1 * | 11/2003 | Bodnar | B21D 5/08 72/181 |
| 2009/0226785 | A1 | 9/2009 | Kihira et al. | 429/30 |
| 2011/0281192 | A1 | 11/2011 | Jones | 429/457 |

OTHER PUBLICATIONS

Jul. 1, 2016 International Search Report and Written Opinion in International Patent Appln. No. PCT/EP2016/060967.
International Search Report issued by WIPO dated Jul. 1, 2016, in connection with International Application No. PCT/EP2016/060967 (with English translation attached).

\* cited by examiner

*Primary Examiner* — Ula C Ruddock
*Assistant Examiner* — Thomas H. Parsons
(74) *Attorney, Agent, or Firm* — Venable LLP

(57) ABSTRACT

A method for treating a bipolar plate for a fuel cell includes passing the bipolar plate between two rows of parallel straightening rollers. Action of the parallel straightening rollers on the bipolar plate result in opposite faces of the bipolar plate being on parallel planes.

9 Claims, 3 Drawing Sheets

PROCESS FOR TREATING A BIPOLAR PLATE FOR A FUEL CELL

FIELD OF THE INVENTION

The present invention relates to the field of fuel cells, in particular the field of fuel cells suitable for use in motor vehicles.

RELATED ART

A fuel cell enables the generation of electrical energy via an electrochemical reaction from a fuel, generally hydrogen, and from an oxidizer, generally oxygen.

A solid electrolyte proton exchange membrane fuel cell (PEMFC) usually comprises a stack of unit cells forming electrochemical generators, each of the unit cells being separated from the adjacent unit cells by bipolar plates. Each unit cell comprises an anode element and a cathode element, separated by a solid electrolyte in the form of an ion exchange membrane, for example made of a sulphured perfluorinated polymer material. According to a usual alternative embodiment, each bipolar plate supplies, on one side, fuel to the unit cell adjacent to this side and supplies, on the other side, oxidizer to the unit cell adjacent to this other side, the supplying operations by the bipolar plates occurring in parallel.

The successive stacking of the plates and of the unit cells is held under bearing pressures that must ensure a good electrical contact and a desired airtightness. Usually, the stack comprises end rigid plates connected by tie rods providing the bearing pressures, with insertion of spring elements to limit the effects of the temperature and humidity variations on the bearing pressures.

Nevertheless, at present, a good desired airtightness can be obtained only by applying high bearing pressures, in particular when the stack comprises a large number of unit cells and intermediate bipolar plates. It follows that the tie rods and the fasteners thereof must be dimensioned accordingly.

The patents US2009/0226785 and US2011/281192 describe simple plates which are passed between two rollers to straighten them. However, these rollers produce an effect of crushing, between them, the plates along lines parallel to the axes thereof. The desired straightening cannot be completely achieved.

BRIEF DESCRIPTION OF EMBODIMENTS OF THE INVENTION

According to an embodiment, a method is proposed for treating a bipolar plate for a fuel cell having opposite faces and comprising two stamped metal sheets fixed to each other and having grooves in the opposite faces of the bipolar plate.

This method comprises: passing the bipolar plate between two rows of straightening parallel rollers, the straightening rollers of one of the rows of rollers being, in the direction of the movement of the bipolar plate to be treated, offset with respect to those of the other row of rollers, said grooves being suitable to deform as the bipolar plate passes between said rows of straightening rollers, such that the opposite faces of the bipolar plate tend to parallel planes.

Thus, the bipolar plate is corrected so as to be inserted into a stack while reducing the forces required to exert the desired-bearing pressures in order to obtain the desired airtightness and optionally the electrical contacts.

The two rows of straightening rollers can be set at a distance corresponding to the desired thickness to be achieved for the bipolar plate.

The bipolar plate can be moved between the rows of straightening rollers in a direction perpendicular to the direction in which it has a greater number of long grooves.

The two rows of straightening rollers can define rolling parallel planes.

BRIEF DESCRIPTION OF THE DRAWINGS

A method of treating a bipolar plate for a fuel cell will now be described by way of non-limiting example, illustrated by the drawing in which.

DETAILED DESCRIPTION OF EMBODIMENTS OF THE INVENTION

Figure 1:
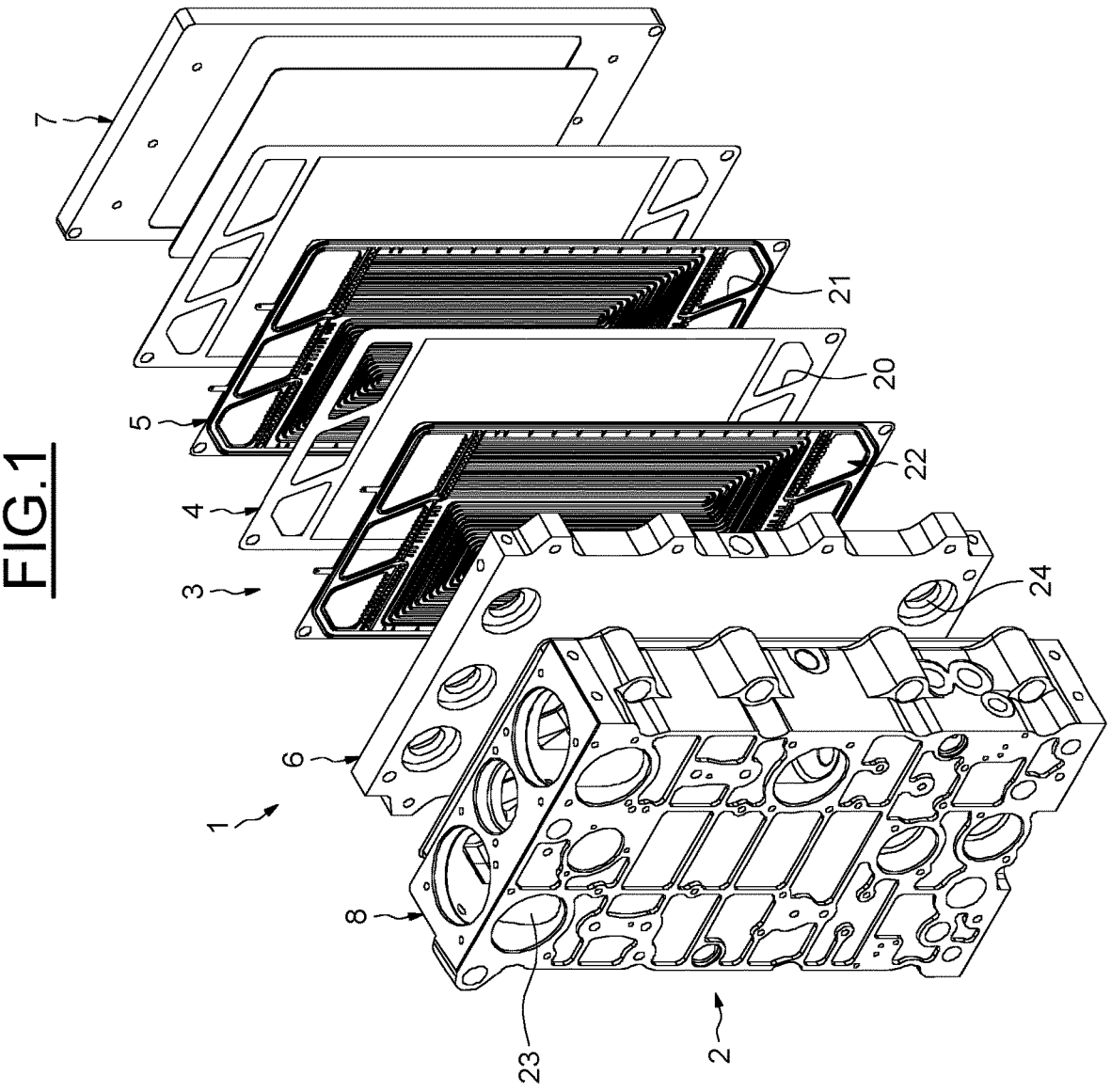
FIG. 1 shows a perspective exploded view of a fuel cell, including a bipolar plate.

As illustrated in FIG. 1, a fuel cell 1 in particular comprises a stack 2 of parallelepipedal form, composed of plates overlaid along a stacking axis and attached in an airtight manner, namely a set 3 of unit cells 4 in the form of plates, separated by bipolar plates 5, thick and rigid end plates 6 and 7, clamping the assembly 2, and finally an end block 8. This stack 2 is held by compression means (not shown) such as tie rods.

Each unit cell 4 comprises three overlaid layers, namely an anode, an electrolyte and a cathode (not shown). Each bipolar plate 5 supplies, on one side, fuel, generally hydrogen, to the unit cell adjacent to this side and supplies, on the other side, oxidizer, generally oxygen, to the unit cell adjacent to this other side, so that electrochemical generators are formed.

Figure 2:
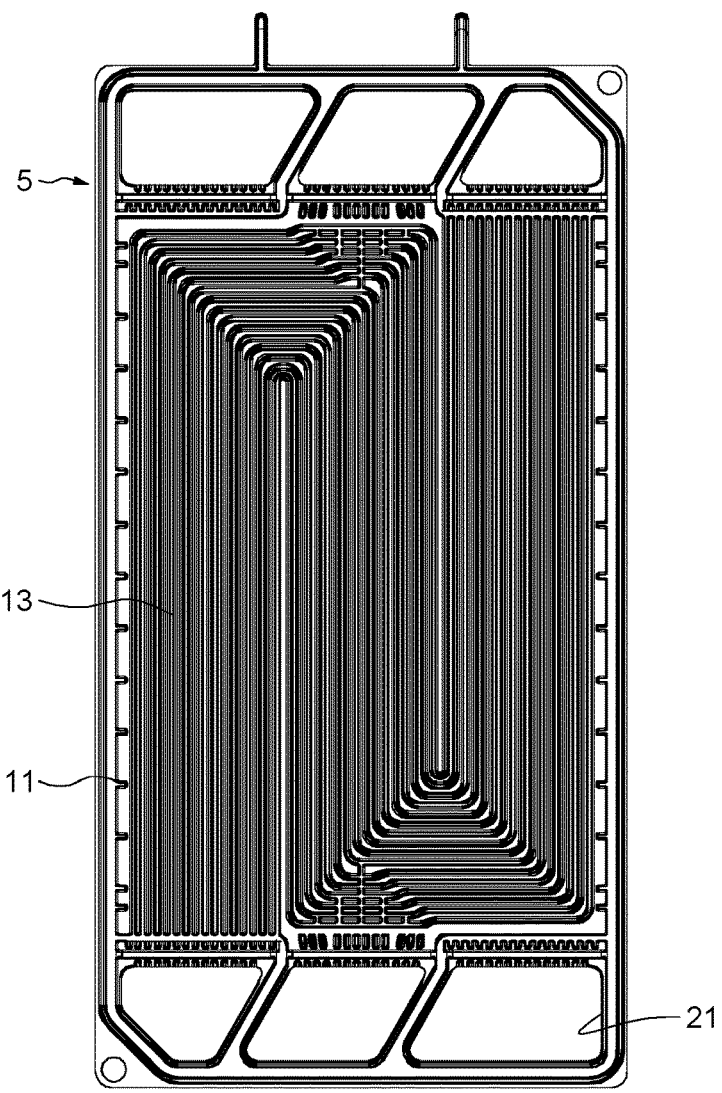
FIG. 2 shows a front view of the bipolar plate of the fuel cell of FIG. 1.
Figure 3:
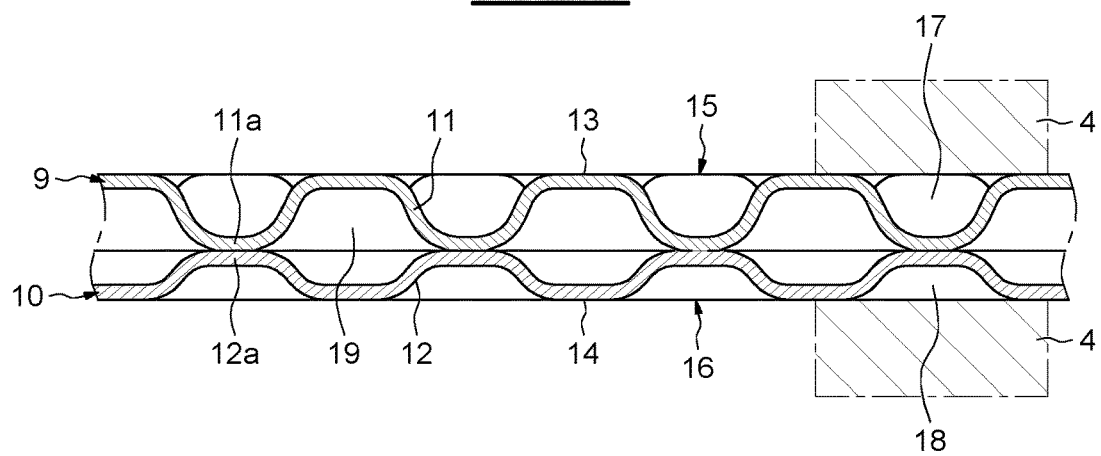
FIG. 3 shows an enlarged partial cross section of the bipolar plate.

As illustrated in particular in FIGS. 2 and 3, each bipolar plate 5 is formed by two overlaid stamped metal sheets 9 and 10.

These stamped metal sheets 9 and 10 define pluralities of opposite grooves 11 and 12 set back from zones 13 and 14 defining opposite faces 15 and 16 of the polar plate 5. The bottoms 11a and 12a of the grooves 11 and 12 are attached and fixed together, for example by welding. The grooves 11 and 12 have U-shaped sections with divergent symmetrical legs.

The faces 15 and 16 are intended to be in contact with the adjacent faces of the adjacent unit cells 4, so as to define channels 17 and 18 for selectively circulating the fuel and the oxidizer, these channels extending perpendicularly to the axis of the stack according to a desired topography.

In addition, channels 19 which can be used for the circulation of a cooling fluid are defined between the metal sheets 9 and 10.

As illustrated in particular in FIGS. 1 and 2, the unit cells 4 in the form of plates and the bipolar plates 5 have pluralities of overlaid axial passages 20 and 21, defining a plurality of axial ducts 22 into which the channels 17, 18 and 20 selectively open.

The end block 8 has a plurality of channels 23 suitable to be connected to outside ducts (which are not shown) and selectively connected to the axial channels 22 through through-passages 24 of the end plate 6.

As indicated above, the bipolar plates 5 are manufactured by stamping and welding and have a thickness which is, normally, equal to a desired value. Nevertheless, such manufacturing causes deformations such as curving and warping of the bipolar plates 5.

Figure 4:
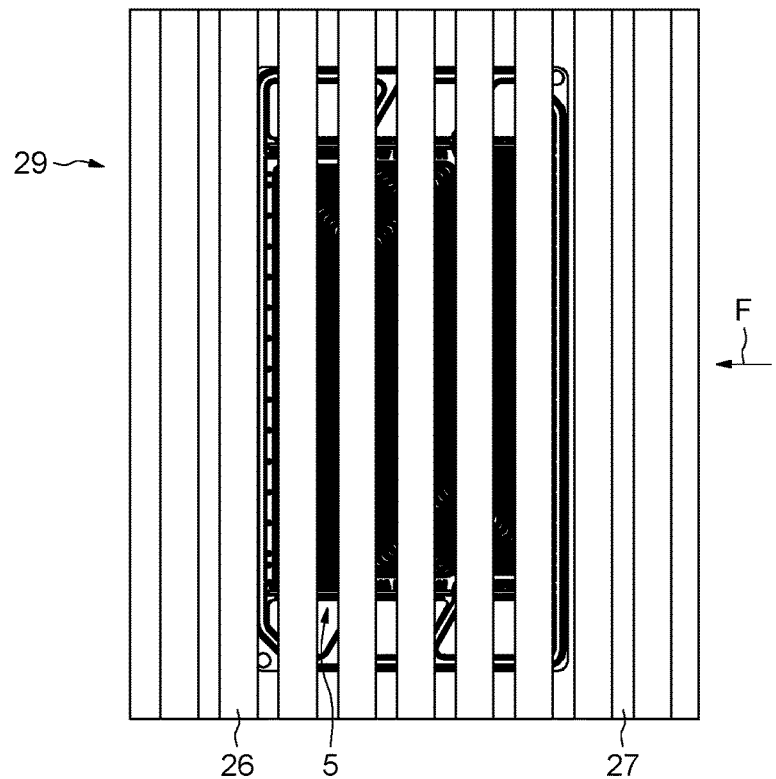
FIG. 4 shows a top view of a straightening machine.
Figure 5:
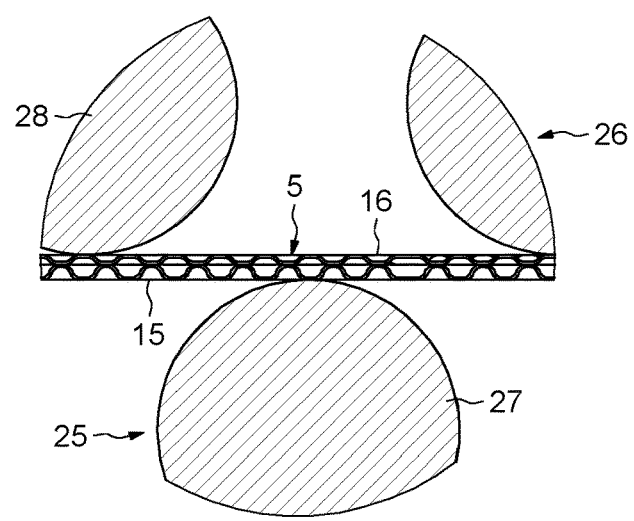
FIG. 5 shows a section of the straightening machine, in a direction of movement.

As illustrated in FIGS. 4 and 5, it is proposed to pass, in a flat manner, each bipolar plate 5 between two rows 25 and 26 of straightening parallel cylindrical rollers 27 and 28 of a straightening machine 29, which is provided with support means that can be set and with means of rotating these rollers.

The numbers of the straightening rollers 27 and 28 are such that several of the straightening rollers 27 and 28 can bear on the opposite faces 15 and 16 of the bipolar plate 5.

The straightening rollers 27 of the row 25 and the rollers 28 of the rows 26 are offset with respect to one another in the translation direction (FIG. 5), for example by half a pitch.

The straightening rollers 27 and 28 are rotated by suitable means (not shown), in order to translate the bipolar plate 5 at a suitable translation speed.

Insofar as the bipolar plate 5 has a greater number of long grooves 11 and 12 extending in a first direction with respect to that extending in other directions, it is preferable to pass it between the rows 25 and 26 of straightening rollers 27 and 28 so that it moves perpendicularly to this first direction.

The distance between the rolling opposite planes defined by the straightening rollers 27 and 28 of the rows 25 and 26 is substantially equal to or very close to the desired thickness of the bipolar plate 5.

During the movement thereof between the two rows 25 and 26 of parallel rollers 27 and 28, the bipolar plate 5 to be treated undergoes bending deformations, at least at certain points of the movement thereof and in one direction and/or in the other direction, between two straightening successive rollers of one of the rows and the straightening roller of the other row, which roller is located between these two straightening rollers.

These bending successive deformations are suitable for deforming the metal sheets 9 and 10 forming it, in particular thanks to the existence of the grooves 11 and 12 which can deform, so that the opposite faces 15 and 16 of the treated bipolar plate 5 tend to parallel planes.

The setting of the distance between the rolling opposite planes of the rows 25 and 26 and the speed of rotation of the rollers 27 and 28 are suitable for producing this effect.

Thus, after the above treatment, the bipolar plates 5, that have been corrected and flattened, can be inserted into the assembly 3, so that the bearing desired pressures between the various plates forming the stack 2, in order to provide the desired airtightness and optionally the desired electrical contacts, can be obtained with reduced axial forces.

The invention claimed is:

1. A method for treating a bipolar plate for a fuel cell, the bipolar plate having opposite faces and including two stamped metal sheets fixed to each other and having grooves in the opposite faces, the method comprising:
    passing the bipolar plate between first and second rows of parallel straightening rollers, the parallel straightening rollers of the first row being, in a direction of movement of the bipolar plate being treated, offset with respect to the parallel straightening rollers of the second row, the grooves being deformed as the bipolar plate passes between the first and second rows of parallel straightening roller, resulting in the opposite faces of the bipolar plate being on parallel planes.

2. The method according to claim 1, wherein the first and second rows of the parallel straightening rollers are set at a separation distance corresponding to a desired thickness to be achieved for the bipolar plate.

3. The method according to claim 2, wherein the bipolar plate is moved between the first and second rows of the parallel straightening rollers in a direction perpendicular to a long-groove direction, the long-groove direction being a direction in which a greatest number of long grooves of the bipolar plate extends.

4. The method according to claim 3, wherein the first and second rows of the parallel straightening rollers define parallel rolling planes.

5. The method according to claim 3, wherein the two stamped metal sheets are fixed to each other by welding before the passing of the bipolar plate between the first and second rows of parallel straightening rollers.

6. The method according to claim 2, wherein the first and second rows of the parallel straightening rollers define parallel rolling planes.

7. The method according to claim 1, wherein the bipolar plate is moved between the first and second rows of the parallel straightening rollers in a direction perpendicular to a long-groove direction, the long-groove direction being a direction in which a greatest number of long grooves of the bipolar plate extends.

8. The method according to claim 7, wherein the first and second rows of the parallel straightening rollers define parallel rolling planes.

9. The method according to claim 1, wherein the first and second rows of the parallel straightening rollers define parallel rolling planes.

* * * * *